Figure 14:

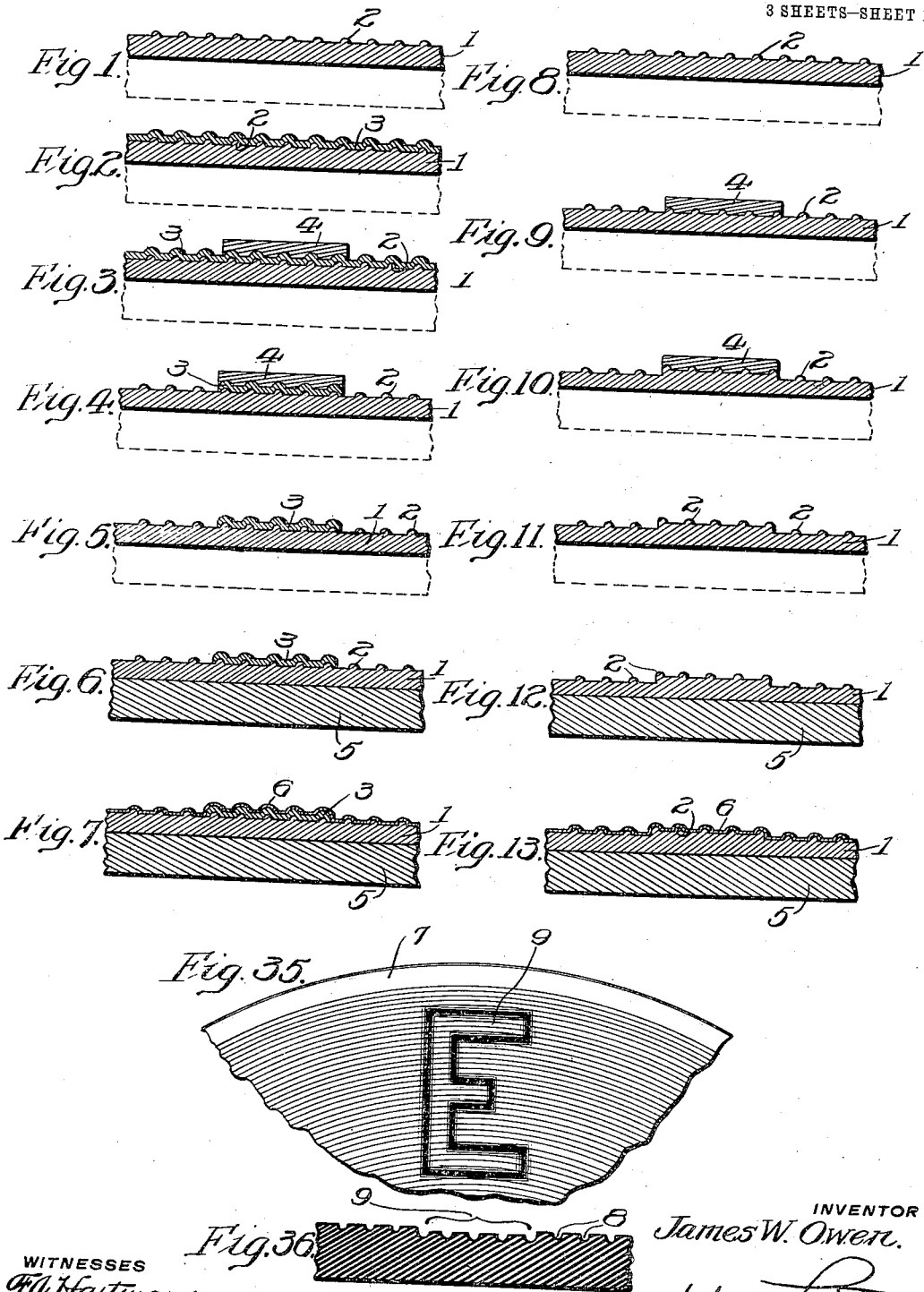

J. W. OWEN.
METHOD OF MAKING SOUND RECORDS AND THE MATRICES FOR FORMING SOUND RECORDS.
APPLICATION FILED MAY 4, 1908.

1,011,838.

Patented Dec. 12, 1911.

3 SHEETS—SHEET 2.

INVENTOR
James W. Owen.

WITNESSES

BY

ATTORNEY

J. W. OWEN.
METHOD OF MAKING SOUND RECORDS AND THE MATRICES FOR FORMING SOUND RECORDS.
APPLICATION FILED MAY 4, 1908.

1,011,838.

Patented Dec. 12, 1911.
3 SHEETS—SHEET 3.

INVENTOR
James W. Owen.

WITNESSES

BY

ATTORNEY

UNITED STATES PATENT OFFICE.

JAMES W. OWEN, OF PHILADELPHIA, PENNSYLVANIA, ASSIGNOR TO VICTOR TALKING MACHINE COMPANY, A CORPORATION OF NEW JERSEY.

METHOD OF MAKING SOUND-RECORDS AND THE MATRICES FOR FORMING SOUND-RECORDS.

1,011,838.  
Specification of Letters Patent.  Patented Dec. 12, 1911.

Application filed May 4, 1908. Serial No. 430,658.

*To all whom it may concern:*

Be it known that I, JAMES W. OWEN, a citizen of the United States, and a resident of the city of Philadelphia, county of Philadelphia, and State of Pennsylvania, have invented certain new and useful Improvements in the Method of Making Sound-Records and the Matrices for Forming Sound-Records, (Case B,) of which the following is a full, clear, and exact disclosure.

The object of my invention is to produce a commercial sound record which cannot easily be duplicated or dubbed without either impairing or injuring the sound record formed thereon, or indicating the source of origin of the original record.

A further object of my invention is to produce a sound record or a matrix from which sound records may be pressed having identification marks, by which I mean marks distinct from the record groove or ridge located upon the recorded portion of the record.

A further object of my invention is to form the said marks in the matrix, from which records may be pressed, by an etching process.

In the drawings forming a part of this specification in which like characters are used to designate the same parts throughout the various views, Figures 1 to 7 indicate diagrammatically, various steps formed in carrying out my invention; Figs. 8 to 13 indicate in a similar manner a modification of my process; Figs. 14 to 20 indicate a further modification of my process and Figs. 21 to 27 another modified method of forming marks upon the recorded surface of the matrix and Figs. 28 to 34 a still further modified method of carrying out my improved method. Figs. 35 and 36 are fragmentary plan and sectional views respectively of a sound record formed in accordance with my invention.

In carrying out my method I first make a master record in the ordinary way and then I form a shell or a negative from said master record by any of the well known methods of electrodeposition. The next step is to form in this negative or shell or upon the matrix formed therefrom identification marks, as above described and I may make such marks in a variety of ways.

Referring first to Figs. 1 to 7, Fig. 1 is a sectional view of a negative or shell 1, which has been formed from the master record as above indicated. This shell has the sound waves formed as a narrow ridge 2 on the face of the shell, the same being a reverse of the sound record formed in the master record. The shell 1 is preferably made of copper and is formed by copper plating the master record in any electro-plating bath. The shell 1 is first given a coating of a suitable material which will be readily effected by a mordant which will not violently attack the copper shell. I may form this coating by depositing over the face of the shell a thin coating of zinc by the electroplating process. This coating of zinc is very thin and the ridges forming the record groove will plainly appear on the face of the zinc coating. This step is illustrated in Fig. 2, in which 3 indicates the zinc coating. I then form upon the zinc coated surface of the shell letters, words, marks or other characters which it is desired to have appear upon the face of the finished matrix by coating a part of the surface of the zinc with an etching-ground, as plainly illustrated in Fig. 3. The letters or marks may be formed by painting or stenciling a portion of the zinc surface with a material which will resist the action of a mordant or the portions of the zinc surface which it is desired to have appear as marks may be left unprotected while the surrounding portion of the zinc may be coated with the said etching-ground. The unprotected portion of the zinc is then eaten away or removed and a part of the surface of the coated shell depressed by immersing the whole in a bath which will rapidly act upon the zinc coating but which will not materially affect the copper. A weak cold bath of sulfuric acid may be used for this purpose and after having been immersed for a short time all the zinc will be removed from the surface of the copper shell except that which was protected by the etching-ground, as illustrated in Fig. 4. The etching-ground is then removed in any suitable manner as shown in Fig. 5, and the shell is united to a backing 5 in the usual manner by the sweating process, as illustrated in Fig. 6 and the whole matrix so formed may be given a protecting surface 6 of nickel, as shown in Fig. 7. In carrying out this process it is immaterial whether the backing 5 is united to the shell 1 at the first or at the end of the process, although I preferably unite it after the etching-ground has been removed, as above indicated.

My invention may also be carried out in the manner illustrated in Figs. 8 to 13, in which the shell 1 has applied to the recorded surface thereof the etching-ground 4, without first plating the shell with zinc, as illustrated in Figs. 8 and 9, the shell having a part of its surface thus protected is then immersed in a bath which will attack the copper and the whole unprotected surface is thus depressed for a slight distance, as shown in Fig. 10, after which the shell is removed from the bath and the etching-ground removed (Fig. 11), then backed up by uniting it to a suitable backing 5, as shown in Fig. 12, after which the whole may be given a suitable plating 6 of nickel to protect the surface from injury.

Figure 15:
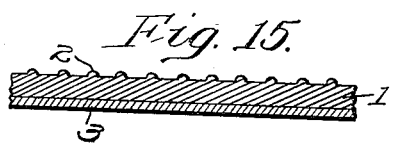
Figure 22:
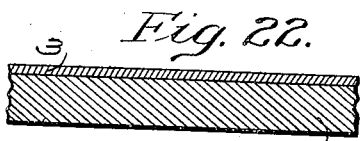
Figure 16:
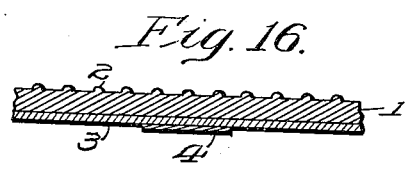
Figure 17:
Figure 18:
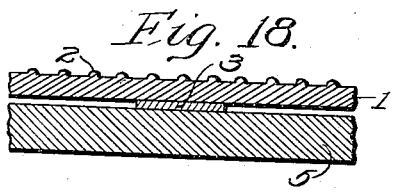
Figure 19:
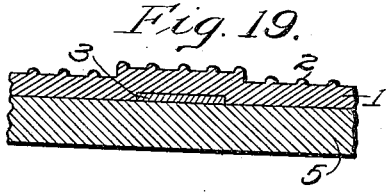
Figure 20:
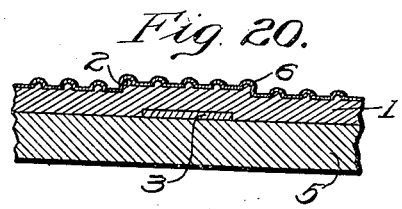
Figure 27:
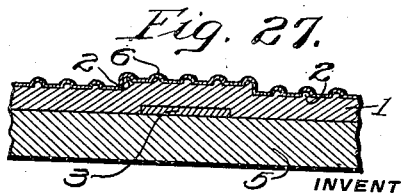

Instead of forming the letters or marks directly upon the face of the shell, as above illustrated and described, I may form the same upon the back of the shell, as illustrated in Figs. 14 to 20, in which Fig. 14 indicates the shell 1, the back of which may be provided with the zinc or other surface 3, as shown in Fig. 15. A part of the zinc surface may then be protected in like manner by a suitable etching-ground 4 (Fig. 16) after which it is immersed into a bath which will act upon the unprotected zinc coating as shown in Fig. 17. After the zinc surface has been sufficiently depressed or the unprotected portions completely removed by the action of the bath, the shell is taken out of the bath and the etching-ground removed in any suitable way. The shell is then placed upon a suitable backing 5 and united thereto under pressure as by the sweating process, whereupon the slightly projecting zinc surfaces will be pressed into the back of the shell with the result that the surface overlying the zinc coated portion will be raised slightly about the general surface of the record, as illustrated in Fig. 19, it being understood, however, that when the shell is united to the backing by the sweating process it is of course necessary to protect the recorded portion of the shell by interposing between the shell and the pressing plate a sheet of elastic protective material such as a sheet of asbestos, which will prevent the ridges on the shell from becoming injured and will allow the surface of the shell overlying the zinc coated portion of the backing to slightly yield and form the letters or marks on the surface of the shell. As in the previously described methods the matrix thus formed may be given a protective coating of nickel, as shown in Fig. 20.

Figure 21:
Figure 23:
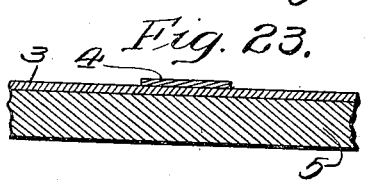
Figure 24:
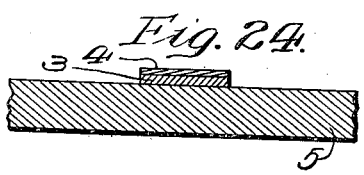
Figure 25:
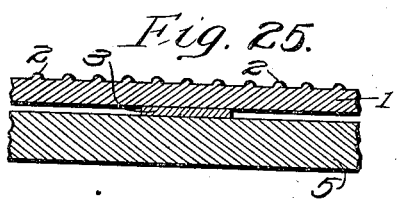
Figure 26:
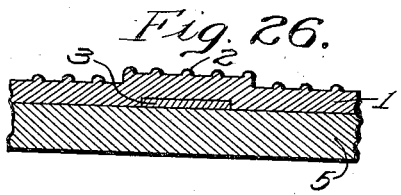

In Figs. 21 to 27 I have shown a still further modification of my process in which the letters or marks are formed upon that surface of the backing which is adjacent to the shell. The backing is shown in Fig. 21, and upon the face of the backing I may deposit a thin coating of zinc, in the manner above described as shown in Fig. 2. A portion of the zinc surface is then protected by applying thereto a suitable etching-ground 4, as shown in Fig. 23, after which the unprotected portion of the zinc surface may be eaten away by a suitable mordant, as shown in Fig. 24. The shell is then placed upon the backing as shown in Fig. 25, and united thereto under pressure, whereupon the zinc coated portions of the surface of the backing will present slight elevations in the face of the backing which will be pressed through the thin shell when the shell is united with the backing by the sweating process, thus forming the marks upon the recorded surface of the shell, as shown in Fig. 26. The finished matrix is shown as nickel plated in Fig. 27.

Figure 28:
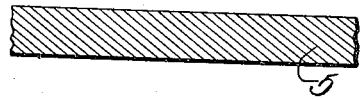
Figure 29:
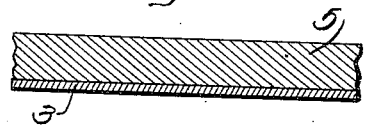
Figure 30:
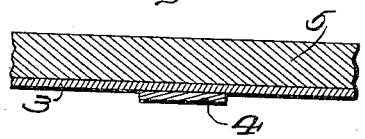
Figure 31:
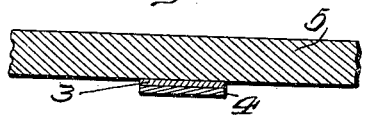
Figure 32:
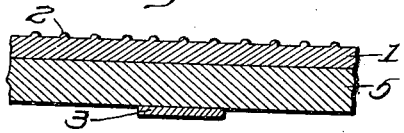
Figure 33:
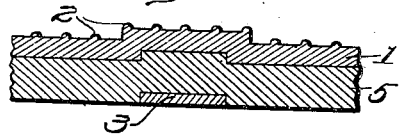
Figure 34:
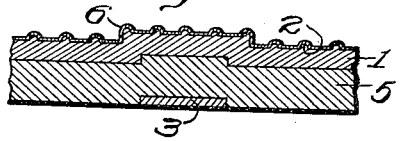

In Fig. 28 to 34 inclusive, I have shown a still further method of forming the marks upon the surface of the matrix. The backing shown in Fig. 28 is given a thin coating of zinc or other suitable material upon the back thereof, as illustrated in Fig. 29. Parts of the zinc, or otherwise coated backing, are protected by a suitable etching-ground 4, as shown in Fig. 30, and the parts of the coating not covered with the etching-ground are depressed in any suitable manner, as by immersing in a bath of weak sulfuric acid. This step is illustrated in Fig. 31. The shell or matrix 1 is then placed upon the face of the backing 5, as illustrated in Fig. 32, and the shell is united to the backing to solder the two said parts together under pressure, with the result that the projecting portions 3 on the back of the backing are pressed into the backing and through it, and also through the thin shell, so that that portion of the backing which presented a raised appearance, due to the thin deposit of zinc, or similar material upon the back thereof, appear upon the face of the shell, and, consequently upon the face of the matrix as slight elevations, as illustrated in Fig. 33. The whole may then be given a nickel plating, as in the previously described processes, this step being shown in Fig. 34.

A commercial record 7 may be formed from any of the matrices shown in Figs. 6, 12, 19, 26, or 33, or from the nickel plated matrices shown in Figs. 7, 13, 20, 27, or 34, with the result that the portions of the record groove 8 traversing the raised portion of the matrix will be slightly depressed below the general surface of the record forming marks, as at 9 Figs. 35 and 36, but the continuity of the groove or the depth or width of the groove will not be materially changed where it traverses the said marked portions.

It is, of course, obvious that in these processes the portions of the zinc surface remaining after the shell has been subjected to the action of the mordant, as illustrated in Figs. 5, 11 and 18 or the zinc coating has been subjected to the action of the mordant, may represent either the marks or the surface surrounding the marks, in either case the same general characteristics being present, that is to say, a part of the effective surface of the face of the shell or a part of one of the adjacent surfaces of the shell or of the backing is in part depressed or in part elevated with respect to the other parts of the surface.

I prefer to form the marks upon the recorded surface of the matrix and consequently in the recorded surface of the record produced therefrom, as illustrated in the various views of the drawings and when I use the expression "recorded part or portion of the record" I mean the whole or any part of the surface of the tablet or of the matrix bounded by the beginning and the end of the record groove or ridge including any portion of the surface of the tablet or the matrix between the grooves or ridges or any portion of the surface, or sides, or tops, or bottoms of the grooves or ridges forming the sound record.

For convenience I call the marks which I have formed in the manner above described, "identification marks" but it is obvious that these marks may be of any desired form, shape or character, or they may be words or letters or may be provided to cause an ornamental effect in the face of the finished record any of which marks would fully serve to identify the record, as well as impart any other information which it is desired to incorporate into a record to the user of the record.

Commercial records may be pressed directly from the matrices, formed in the manner above described, or the matrices may be used as duplicate master records from which to produce, in any suitable manner, other matrices for the production of commercial records.

I have, in the above specification, described one manner in which the matrix or shell after first having been coated with a suitable etchable material, may be subjected to the action of the mordant, that is to say, by placing it in a suitable bath with certain portions of the coated surfaces protected from the action of the mordant by a suitable etching ground. My invention, however, is not limited to this exact method of carrying out my invention, for I fully contemplate other means of removing a portion of the coating.

I may paint or stamp the letters or marks upon the zinc film or other coating by means of a pad, or stamp, or brush, impregnated with cold sulfuric acid and water, or any other suitable etching reagent or mordant. In this case it may not be necessary to first protect any portion of the zinc or other coating with an etching ground, since the reagent above described will act very rapidly upon the coating of zinc and remove it without spreading it. It is also apparent that the film of zinc or other material is very thin and the zinced or other coated surface will have in it the same grooves or ridges as appeared in the uncoated matrix, and the grooves and ridges will be continuous and of substantially the same depth, or height, and width on the zinc surface as they have on the surface of the matrix beneath such coating. It is also to be observed that when the face of the shell or matrix is the portion to which the zinc or other coating is applied, the shell and backing may be united prior to such coating and also when the marks are formed upon the back of the backing, although usually it would be preferable to form the marks on the shell or the backing as might be desired before the same are united, since, in some instances, it would save one operation, and would further reduce the liability of injury to the record of the sound recorded.

Inasmuch as the coating is very thin, the elevations or depressions will be very slight and when commercial records are provided with the marks obtained by carrying out the above process, the stylus, in reproducing, will ride smoothly over the elevations, without producing any noise, due to such elevation or depression. In other words, the marks will not phonetically affect the stylus as it traverses the record groove.

While I have described various ways in which my invention may be put into practice, I do not wish to be construed as being limited to the exact steps or order of steps above set forth, since my invention contemplates a variation of processes in which a portion of the surface of the matrix is raised or depressed for the purpose of forming marks therein by an etching process, so long as such variations fall within the scope of the appended claims.

Having now described my invention what I claim and desire to protect by Letters Patent of the United States is:

1. The method of making a matrix with identification marks thereon, which consists in forming a shell, coating the recorded surface of said shell with a material capable of being etched, forming the desired marks on the said material with an etching-ground, depressing that part of said material which is not protected, and backing said shell.

2. The method of making a matrix with identification marks thereon, which consists in forming a shell, coating said shell with a metallic material, forming the desired marks on said material with a protective coating, depressing that part of said material which is not protected, and backing said shell.

3. The method of making a matrix with identification marks thereon, which consists in forming a shell, coating said shell with a material capable of being etched, forming the desired marks on the said material over the recorded surface thereof with an etching-ground, depressing that part of the said material which is not protected, and backing said shell.

4. The method of making a matrix with identification marks thereon, which consists in forming the marks upon the matrix with an etching-ground, depressing that part of the matrix which is not protected by said etching ground, and backing up said matrix.

5. The method of making a matrix with identification marks thereon, which consists in forming the marks upon the recorded surface of the matrix with an etching-ground, cutting away the exposed surface of said matrix by a suitable mordant, and backing up said matrix.

6. The method of making a matrix with identification marks thereon, which consists in forming the marks upon the recorded surface of the matrix with an etching-ground, cutting away the exposed portion of said surface by a suitable mordant, removing said etching-ground and backing up said matrix.

7. The method of marking a matrix, which consists in forming a shell, covering one side of said shell with a material capable of being etched, forming the desired marks in said material within the boundaries of planes passing substantially normal to the beginning and the end of the record groove with an etching-ground, and depressing the unprotected portion of said material.

8. The method of marking a matrix, which consists in forming a shell, covering one side of said shell with a material capable of being etched, protecting parts of the surface of said material, and depressing the unprotected parts of the surface of said material.

9. The method of forming a matrix which consists in covering one side of said matrix with a coating of zinc, protecting parts of said surface by forming the desired marks upon said surface within the area of the recorded portion of said matrix with an etching-ground, and etching the unprotected portion of said material.

10. The method of marking a matrix which consists in changing the relative heights of parts of the surface of said matrix within the area of the recorded portion thereof to form the desired marks by an etching process.

11. The method of making a matrix which consists in forming elevated marks upon one surface of said matrix within the area of the recorded portion of said matrix by an etching process, and backing up said matrix.

12. The method of making a matrix which consists in forming marks upon one surface of the matrix by a suitable etching-ground, subjecting the matrix to the action of a suitable mordant, and removing said etching ground.

13. The method of making a matrix which consists in forming upon one surface thereof the desired marks with a protective coating, depressing the unprotected portion of said surface, and backing up said matrix.

14. The method of marking a matrix which consists in coating the same with a metallic substance, and depressing parts of said substance.

15. The method of marking a matrix which consists in coating the same with an etchable substance, and depressing parts of said substance by a mordant.

16. The method of making a matrix which consists in forming a shell, coating said shell with an etchable material, changing the heights of parts of said substance, and backing said shell.

17. The method of marking a sound record matrix, which consists in coating the same with an etchable material, changing the heights of parts of said material by a mordant, and nickel-plating said matrix.

18. The method of marking a matrix which consists in coating the surface of the matrix with a material capable of being etched, forming the marks upon said surface with a suitable mordant, and uniting said shell to a backing.

In witness whereof I have hereunto set my hand this 2nd day of May A. D. 1908.

JAMES W. OWEN.

Witnesses:
 ALSTON B. MOULTON,
 ALEXANDER PARK.